(12) United States Patent
Yamaguchi et al.

(10) Patent No.: US 9,729,094 B2
(45) Date of Patent: Aug. 8, 2017

(54) AUTOMATIC SUPPRESSION DEVICE FOR CYCLIC DISTURBANCE

(71) Applicant: MEIDENSHA CORPORATION, Tokyo (JP)

(72) Inventors: Takashi Yamaguchi, Ota (JP); Yugo Tadano, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 14/896,845

(22) PCT Filed: Jun. 10, 2014

(86) PCT No.: PCT/JP2014/065374
§ 371 (c)(1),
(2) Date: Dec. 8, 2015

(87) PCT Pub. No.: WO2014/199994
PCT Pub. Date: Dec. 18, 2014

(65) Prior Publication Data
US 2016/0134218 A1    May 12, 2016

(30) Foreign Application Priority Data

Jun. 10, 2013 (JP) ................. 2013-121466

(51) Int. Cl.
*H02P 1/00* (2006.01)
*H02P 7/28* (2016.01)
(Continued)

(52) U.S. Cl.
CPC ............ *H02P 7/28* (2013.01); *B60L 15/025* (2013.01); *H02P 21/05* (2013.01); *H02P 21/20* (2016.02)

(58) Field of Classification Search
CPC ............ H02P 21/05; H02P 21/20; H02P 6/10
See application file for complete search history.

(56) References Cited

U.S. PATENT DOCUMENTS 6,329,781 B1   12/2001 Matsui et al.
2014/0203752 A1*  7/2014 Yamamoto .............. H02P 23/00
                                                                318/620

FOREIGN PATENT DOCUMENTS

JP      2000-228892 A    8/2000
JP      2007-274782 A   10/2007
(Continued)

OTHER PUBLICATIONS

Korean Office Action, Oct. 26, 2016, 4 pages.

*Primary Examiner* — Karen Masih
(74) *Attorney, Agent, or Firm* — Foley & Lardner LLP

(57) ABSTRACT

In torque pulsation suppressing control in apparatus using battery as main power source, with feedforward table, there arises compensating table error due to voltage fluctuation by battery internal resistance, depending on load power.
In system where compensating values for suppressing torque pulsation are collected beforehand in the form of compensating table, and the torque pulsation of each frequency component is suppressed by the torque compensating quantity determined by inputting torque command and sensed rotational speed, the system senses main power source voltage of controlled object, and to perform compensation by outputting the torque compensating quantity dependent on the voltage by inputting into the compensating table corresponding to voltage. Furthermore, a compensation correcting section corrects torque compensating quantity Tcn determined by the sum of output Ta of real part compensating table and quantity jTb of imaginary part compensating table, with predetermined table or proportional expression depending only on voltage.

10 Claims, 8 Drawing Sheets

(51) Int. Cl.
*H02P 21/05* (2006.01)
*B60L 15/02* (2006.01)
*H02P 21/20* (2016.01)

(56) References Cited

FOREIGN PATENT DOCUMENTS

| JP | 2011-050118 A | 3/2011 |
| JP | 4839119 B2 | 10/2011 |
| JP | 2013-085330 A | 5/2013 |

\* cited by examiner rotational speed sensing section

PRIOR ART

US 9,729,094 B2

AUTOMATIC SUPPRESSION DEVICE FOR CYCLIC DISTURBANCE

TECHNICAL FIELD

The present invention relates to an automatic periodic or cyclic disturbance suppression apparatus or device for automatically suppressing torque ripple (torque pulsation) in a rotating electric machine such as motor, and more specifically to a compensating table of compensation values prepared by learning a compensation current for each of torque pulsation frequency components.

BACKGROUND ART

Control for suppressing occurrence of periodic disturbance is used in various controls such as positioning control with robot, shaft torque resonance suppression in dynamometer system, and vibration suppression of motor housing. In these applications, there is a demand for suppressing periodic disturbance accurately. A motor, for example, produces torque ripple in principle, and thereby causes various problems such as vibration, noise, adverse influence on ride quality and electrical and mechanical resonances. Especially, in the case of an interior PM motor spreading wide recently, there are produced cogging torque ripple and reluctance torque ripple compositely. A control method for suppressing this torque ripple is shown in Patent Document 1.

FIG. 13 is a block diagram showing a motor torque pulsation suppression system disclosed in Patent Document 1. This system is arranged to control the torque/speed of an electric motor with an inverter of a current vector control type. From motor drive currents iu, iv and iw sensed by a current sensor 12, and a rotor rotational angle θ of a motor 2, a coordinate transforming section 13 produces, by conversion, currents id and iq of a d-axis and q-axis orthogonal rotation coordinate system synchronous with the motor rotation coordinates. A current vector control section 11 of an inverter 1 controls the motor current by comparison between the converted d axis and q axis sensed currents and command values (id*, iq*). The rotor rotation angle ε is determined, from an encoder waveform abz produced by a rotational position sensor 3, by a speed □ phase sensing section 14, together with a speed ω.

A torque/id, iq converting section 15 converts a command torque Tref from a controller 5 and the motor rotation speed co into command d-axis and q-axis currents Id* and Iqo* in the rotation dq coordinate system in the vector control. A torque pulsation compensating current iqc* is superposed or added to the command q-axis current Iqo*, to determine a current vector control command. The controller 5 includes a torque ripple suppression control section or means 5A and a learning section or means 5B, and stores the compensating current required for suppressing the torque pulsation in the form of a Fourier coefficient table in a memory.

Then, a torque pulsation suppression control for suppressing torque pulsation in a feedforward manner is performed with the construction of a torque pulsation suppression system including a compensating table 16 shown in FIG. 14. Unlike FIG. 13, in the system of FIG. 14, controller 5 and torque meter 4 are omitted, the inverter 1 is provided with a compensating current producing section or means for suppressing torque pulsation, and torque command Tref* is applied directly to the compensating current producing section. As the compensating current generating section, there are provided an amplitude phase compensating current table 16 and a compensating current generating section 17.

The system of Patent Document 1 includes the upper controller to produce the control command and controls the controlled object or plant producing periodic disturbance, to suppress vibrations with the vibration suppressing compensating table obtained by a periodic disturbance observer. In other words, a torque pulsation component of the motor is extracted to perform the feedforward control to the controlled object, and the torque pulsation suppressing section or means is provided to determine the compensating current required to suppress the extracted torque pulsation component, and to suppress suppressing the torque pulsation by feed the compensating current back to the control apparatus of the controlled object. The system leans the torque pulsation compensating current at the time of torque pulsation suppressing control operation of the torque pulsation suppressing section, and values of the compensating current are collected in a table and stored in the control apparatus. At the time of the motor control operation, the system compensates for the torque pulsation in the feedforward manner with the compensating current read out from the table.

Patent Document 1: JP published patent document JP2011-50118A

SUMMARY OF THE INVENTION

In the case of the compensating table for the feedforward control, the system obtains the rotational speed or number of revolutions of the controlled object with a rotational speed obtaining section, inputs the rotational speed N(ω) and the variably set torque command Tref*, as an input variable, to the compensating table, and performs the compensation with a deviation between the outputted torque compensation quantity or value Tcn at each point and the set torque command Tref*. Therefore, the system can improve the suppression response and simplify the construction of the control apparatus. However, when the controlled object fluctuates for some reason, there appears a compensation error basically from a discrepancy from the feedforward table, and the compensation error might amplify the vibration beyond the level before the control, in some cases.

In the case in which the controlled object to which the feedforward table is applied is an apparatus, such as a motor of an electric vehicle, using a battery as a main power source, the voltage inputted to the control apparatus is varied by an internal resistance of the battery in dependence on the load power. Moreover, in dependence on the charge condition or in case of a load connected in parallel, the motor control apparatus itself generates torque ripple, or the current control response fluctuates. Therefore, a compensation table error is produced as mentioned before if the battery voltage fluctuates in the state in which the suppression control is performed by using the feedforward table obtained at a predetermined battery voltage.

Therefore, it is an object of the present invention to provide a higher performance periodic disturbance automatic suppression apparatus taking account of voltage fluctuation or variation during the operation of using the feedforward table, and compensating for an error due to the voltage fluctuation or variation.

According to one aspect, a periodic disturbance automatic suppressing apparatus which uses a compensating table of values of a torque compensating quantity for suppressing torque pulsation, prepared by extracting a torque pulsation frequency component of a controlled object, which determines a value of the torque compensating quantity by inputting a set torque command and a sensed rotational speed and which suppresses torque pulsation of the controlled object at each frequency component by inputting a deviation between the torque compensating quantity and the set torque command into the controlled object, wherein the compensating table is a collection of compensation tables provided, respectively, for voltages or voltage levels and the apparatus is configured to sense a main power source voltage, to input into the compensation table corresponding to the main power source voltage and to output the torque compensating quantity related or variable with variation of the main power source voltage.

According to another aspect of the present invention, a periodic disturbance automatic suppressing apparatus which uses a compensating table of values of a torque compensating quantity for suppressing torque pulsation, prepared beforehand by extracting a torque pulsation frequency component of a controlled object, which determines the torque compensating quantity by inputting a torque command and a sensed rotational speed of the controlled object and which suppresses torque pulsation of the controlled object at each frequency component by inputting a deviation between the torque compensating quantity and the torque command into the controlled object, wherein the compensating table includes a real part compensating table for correcting a real part and an imaginary part compensating table for correcting an imaginary part, and the apparatus comprises a compensation correcting section to receive a sensed value of a main power source voltage V of the controlled object, and to correct the torque compensating quantity Tcn determined by a sum of an output Ta of the real part compensating table and a quantity jTb of the imaginary part compensating table, with a predetermined table or a proportional expression related with variation of the main power source voltage.

According to still another aspect of the present invention (original claim 3), the proportional expression for correcting the torque compensating quantity Tcn is a linear polynomial expressed by;

$$Tc_n = Ta_n \cdot (a \cdot V + b) + jTb_n \cdot (c \cdot V + d)$$

where a suffix n represents an nth order component.

According to still another aspect of the present invention, the apparatus comprises a coefficient table to receive, as inputs, the torque command and the sensed rotational speed of the controlled object, to output coefficient(s) of the polynomial in dependence on torque·rotational speed, and to deliver the output of the coefficient table to the compensation correcting section, and the compensation correcting section is configured to correct the torque compensating quantity Tcn with the predetermined table or the proportional expression in dependence on the torque and rotational speed.

According to still another aspect of the present invention, the proportional expression for correcting the torque compensating quantity Tcn is a linear polynomial expressed by;

$$Tc_n = Ta_n \cdot \{(fa(T^{cmd},N) \cdot V + fb(T^{cmd},N)\} + jTb_n \cdot \{(fc(T^{cmd},N) \cdot V + fd(T^{cmd},N)\}$$

where fa~fd are coefficients, $T^{cmd}$ is the torque command, N is the rotational speed, V is the sensed voltage and n represents an nth order component.

According to still another aspect of the present invention, the apparatus comprises a coefficient table to receive, as an input, the torque command, to output coefficient(s) of the polynomial in dependence on the torque, and to delivers the output of the coefficient table to the compensation correcting section and the compensation correcting section is configured to correct the torque compensating quantity Tcn with the predetermined table or the proportional expression in dependence on the torque.

According to still another aspect of the present invention, the proportional expression for correcting the torque compensating quantity Tcn is a linear polynomial expressed by;

$$Tc_n = Ta_n \cdot \{fa(T^{cmd}) \cdot V + fb(T^{cmd})h\} + jTb_n \cdot \{fc(T^{cmd}) \cdot V + fd(T^{cmd})\}$$

where fa~fd are coefficients, $T^{cmd}$ is the torque command, V is the sensed voltage and n represents an nth order component.

According to still another aspect of the present invention, the apparatus comprises a coefficient table to receive, as input, the sensed rotational speed of the controlled object, to output coefficient(s) of the polynomial in dependence on the rotational speed, and to delivers the output of the coefficient table to the compensation correcting section, and the compensation correcting section is configured to correct the torque compensating quantity Tcn with the predetermined table or the proportional expression in dependence on the rotational speed.

According to still another aspect of the present invention, the proportional expression for correcting the torque compensating quantity Tcn is a linear polynomial expressed by;

$$Tc_n = Ta_n \cdot \{fa(N) \cdot V + fb(N)\} + jTb_n \cdot \{(fc(N) \cdot V + fd(N)\}$$

where fa~fd are coefficients, N is the rotational speed, V is the sensed voltage and n represents an nth order component.

According to still another aspect of the present invention, periodic disturbance automatic suppressing apparatus preparing a compensating table of values of a torque compensating quantity for suppressing torque pulsation, beforehand by extracting a torque pulsation frequency component of a controlled object, determining the torque compensating quantity by inputting a torque command and a sensed rotational speed of the controlled object and suppressing torque pulsation of the controlled object at each frequency component by inputting a deviation between the torque compensating quantity and the torque command into the controlled object, the controlled object employing a battery as a main power source, and including a voltage control section to control a voltage, and the compensating table being a table generated with compensating values by an applied voltage adjusted at each of operating points by the voltage controlling section.

BEST MODE(S) FOR CARRYING OUT THE INVENTION

According to the present invention, in a system in which values of a compensating quantity for suppressing torque pulsation are collected preliminarily and arranged in the form of a compensating table, and the torque pulsation at each of frequency components is suppressed by the torque compensating quantity determined by inputting the set torque command and sensed rotational speed, the system is arranged to sense a voltage of a main power source of the controlled object, and to perform the compensation by outputting the torque compensating quantity dependent on the voltage by inputting into the compensating table corresponding to the voltage, as explained below with reference to the drawings.

Figure 1:
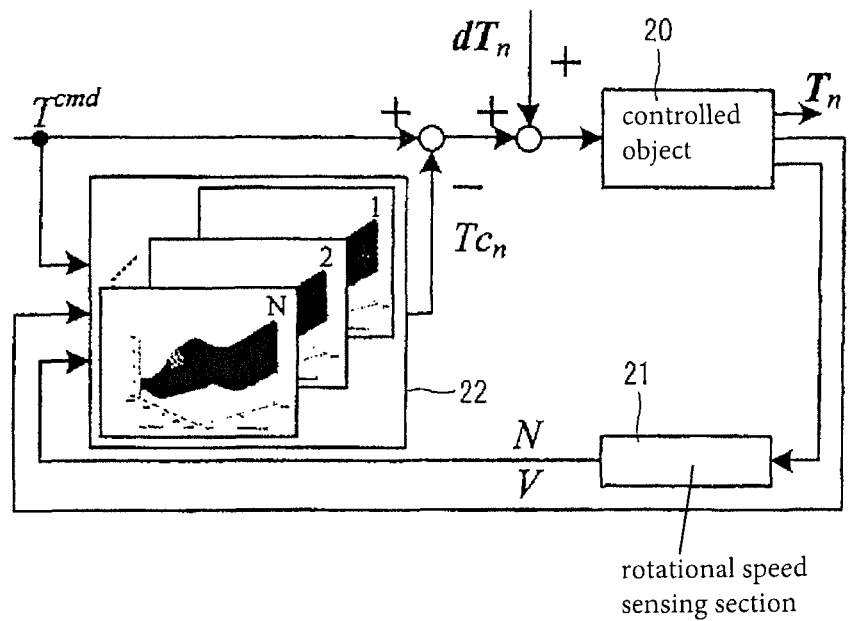
FIG. 1 is a block diagram schematically showing a main part of a periodic disturbance automatic suppressing apparatus according to an embodiment of the present invention.
Figure 14:
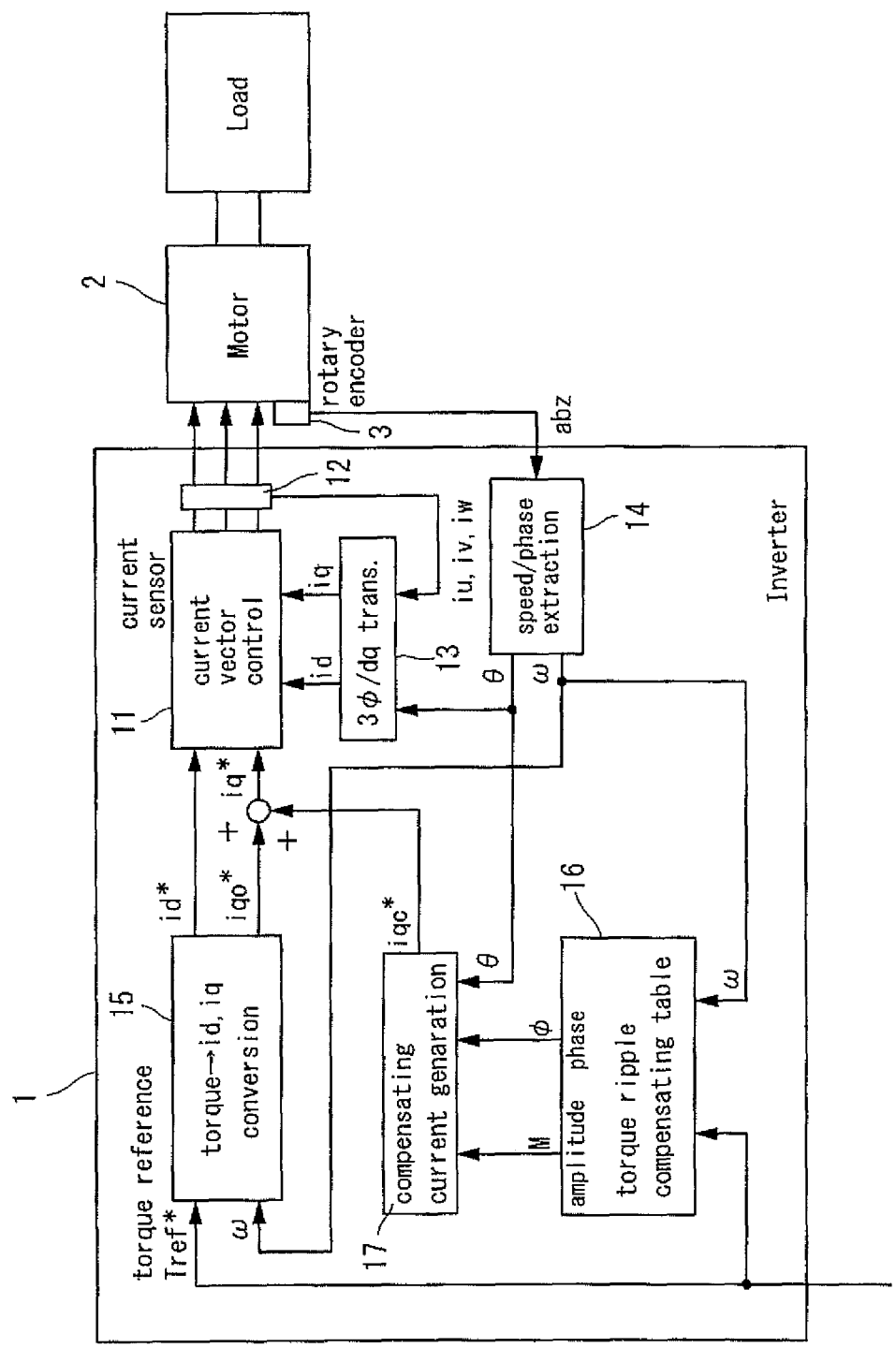
FIG. 14 is a block diagram of the periodic disturbance automatic suppression apparatus of the earlier technology.

FIG. 1 is a block diagram schematically showing a first embodiment of the present invention. The system is constructed basically as shown in FIG. 14. However, a controlled object or plant 20 of this example includes a main circuit of an inverter, a motor, etc. A rotational speed sensing section 21 senses a rotational speed or number of revolutions N of the motor. A voltage V is sensed from a dc circuit of the inverter and inputted, together with the rotational speed N, into a compensating table 22. The compensating table 22 includes a plurality (1~n) of compensation tables. A preset torque command $T^{cmd}$ corresponds to Tref* shown in FIG. 14. This torque command $T^{cmd}$ is also inputted into the compensation table.

Figure 13:
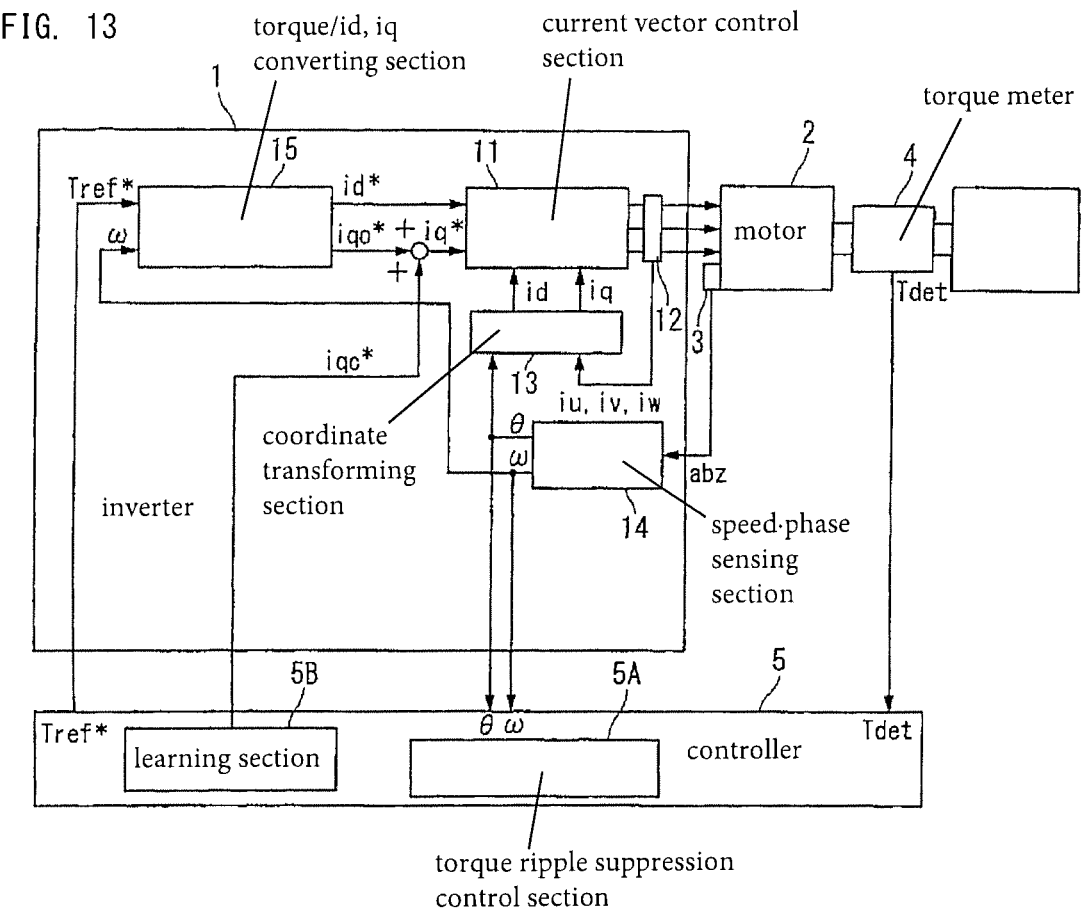
FIG. 13 is a block diagram of a learning system of a periodic disturbance automatic suppression apparatus of earlier technology.

Data of compensating table 22 are obtained in a following method. By varying the torque command $T^{cmd}$ and rotational speed N by the use of the system shown in FIG. 13, the compensating quantity for vibration suppression is determined at that point. This operation is performed repeatedly at all the points in an assumed operating range, and experimental data are obtained. Finally, the compensating table is produced from all the experimental data, directly or with interpolation performed partially.

Figure 2:
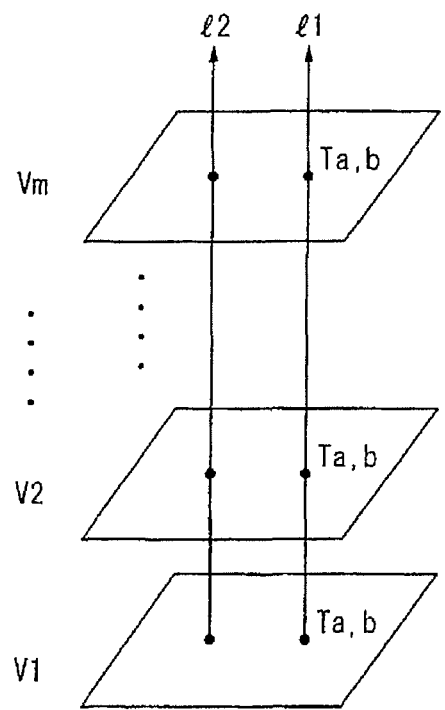
FIG. 2 is a view for illustrating generation of a compensating table.

Furthermore, according to the present invention, in consideration of variation caused by the voltage, the torque compensation value Tcn is produced with the compensating table, by adding a dc voltage V of the main power source of the inverter as one of variation or fluctuation parameters. Thus, compensating table data are produced in the form of (i points of torque×j points of rotational speed)×k points of main voltage as shown FIG. 2. The thus-prepared compensating table is installed in the periodic disturbance automatic suppressing apparatus and the feedforward control is performed. Thus, the system determines the torque compensating quantity Tcn according to a characteristic shown by a line I1 or I2 in accordance with the sensed voltage V.

Figure 3:
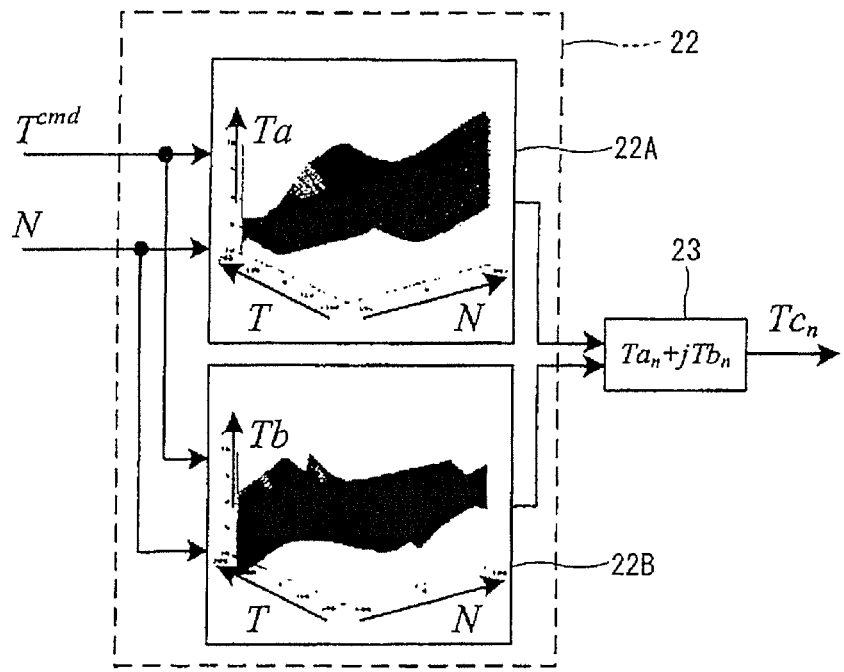
FIG. 3 is a block diagram of the compensating table.

FIG. 3 is a view showing the details of the compensation tables. Each of the n number of the compensating tables includes a real part compensation table 22A and an imaginary part compensation table 22B. Each of these tables is arranged to receive, as inputs, the torque command $T^{cmd}$ and rotational speed N, and to select a torque Ta or Tb corresponding to the inputs. A compensation correcting section (adding section) 23 determines a sum of a real number Tan and an imaginary number jTbn, as the torque compensating quantity Tcn.

At the time of referring to or looking up in the table, the system looks up the compensating quantity in the data of the compensation table 22 from the torque command $T^{cmd}$ versus the sensed current rotation speed N and the main power source voltage V, determines the deviation from the torque command Tcmd by outputting the torque compensating quantity Tcn for suppressing vibrations to a subtracting section, inputs the sum of this deviation and the periodic disturbance dTn into the controlled object 20, and thereby performs the vibration suppression.

According to this embodiment, in the system having the upper controller to produce the control command at the upper level, and suppressing vibrations for the controlled object generating the periodic disturbance, with the vibration suppressing compensating table obtained by the periodic disturbance observer, the compensating table is arranged to use the torque, the rotational speed and main power source voltage as parameters in consideration of the fluctuation of the main power source voltage due to load variation. Therefore, especially when the main power source is a battery, the system can suppress torque ripple produced by the motor control apparatus itself, and provide accurate current control response.

Figure 4:
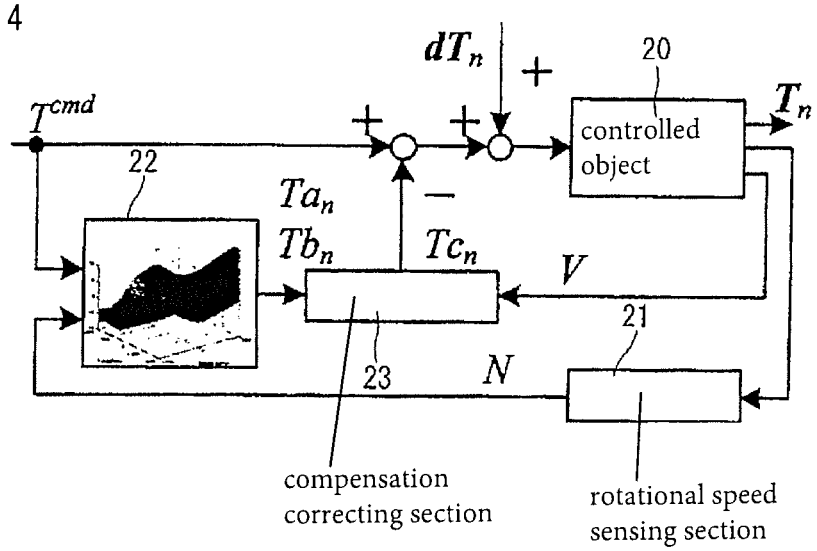
FIG. 4 is a block diagram schematically showing a main part of a periodic disturbance automatic suppressing apparatus according to another embodiment of the present invention.

FIG. 4 shows a second embodiment. In this example, the variation of the compensation quantity is dependent only on the voltage variation of the main power source of the controlled object. In the case of the variation of the compensation quantity depending only on the voltage, the compensating table 22 requires only one set of the real part compensating table 22A and imaginary part compensating table 22B as shown in FIG. 3, and there is no need for obtaining data inclusive of torque·rotational speed as in the first embodiment.

Figure 5:
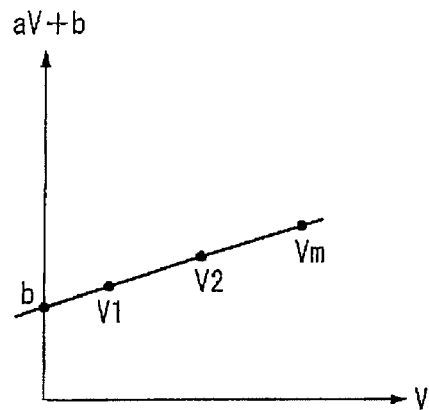
FIG. 5 is a view for illustrating generation of a compensating table.

In this embodiment, the compensating table is obtained by setting the main voltage V at a nominal main voltage, the main voltage V is inputted directly to the compensation correcting section 23, and calculation is performed by using a specified table depending only on the voltage or a proportional expression, to determine the torque compensating quantity Tcn in accordance with the sensed voltage V according to a compensation characteristic as shown in FIG. 5, omitting or saving the memory for storing the compensating table.

When the compensation correcting section 23 performs the correction with a linear polynomial, the torque compensating quantity
Tcn is calculated by a following equation (1).

$$Tc_n = Ta_n \cdot (a \cdot V + b) + jTb_n \cdot (c \cdot V + d) \qquad (1)$$

In the operation of table lookup, the torque quantities Tan and Tbn corresponding to the torque set quantity $T^{cmd}$ and the sensed current rotational speed N are selected from the compensating table 22, and the torque correcting section 23 calculates the torque compensating quantity Tcn by calculation of the equation (1). The torque compensating quantity Tcn is subtracted from the torque command $T^{cmd}$ at the subtracting section to determine the deviation. The vibration suppression is performed by inputting the sum of this deviation and the periodic disturbance dTn to the controlled object 20.

According to this embodiment, in the case using a battery as the main power source of the controlled object, the system performs the vibration suppressing control, against the main power source voltage fluctuation due to variation of the load, by using the mathematical expression or table using the main power source voltage as a parameter. Therefore, the system can save or omit the memory for storing the compensating table. In the other respects, the second embodiment can provide the same effects as the first embodiment.

Figure 6:
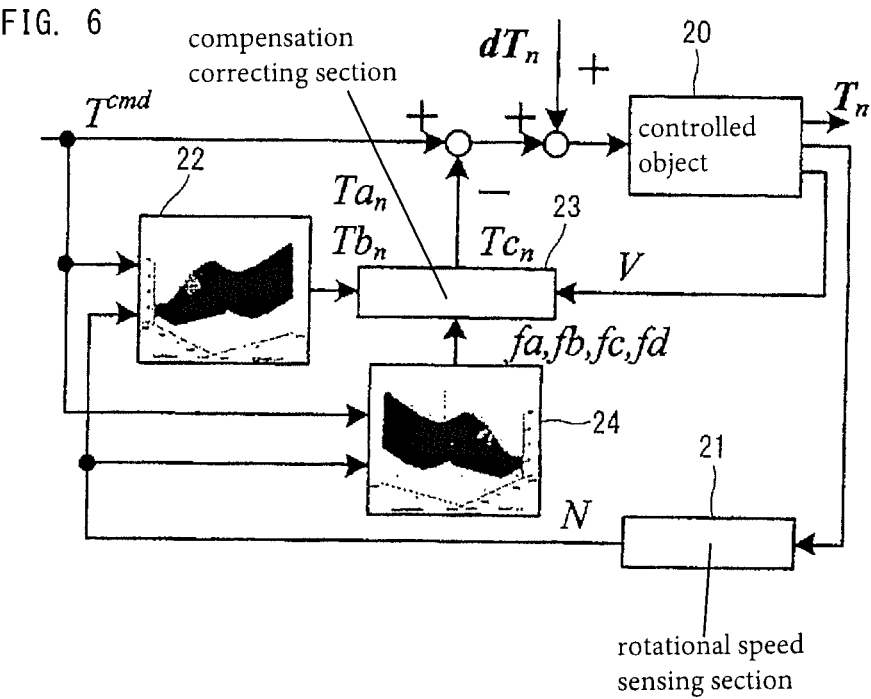
FIG. 6 is a block diagram schematically showing a main part of a periodic disturbance automatic suppressing apparatus according to another embodiment of the present invention.

FIG. 6 shows a third embodiment, which is different from FIG. 4 in that there is provided a coefficient correcting table 24. The torque command $T^{cmd}$ and sensed rotation speed N are inputted to the coefficient correcting table 24 is configured to output coefficients fa, fb, fc and fd corresponding to the inputs, to the compensation correcting section 23. Compensation correcting section 23 corrects the compensating quantity(s) of the nominal compensating table with the nth degree polynomials. The coefficients of the polynomial are adjusted with a table or a mathematical expression depending on the torque·rotational speed. Parameter or parameters of the correcting mathematical expression are calculated by experiment or analysis.

Figure 7:
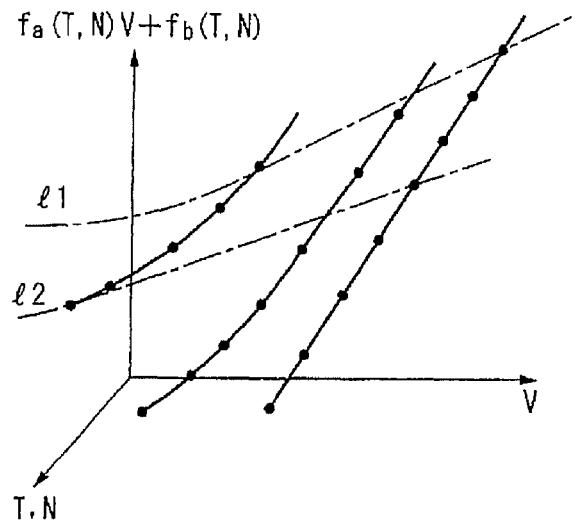
FIG. 7 is a view for illustrating generation of a compensating table.

FIG. 7 shows a mode of the generated compensation table data. Torque compensating quantity Tcn is determined by using a characteristic as shown by a line I1 or I2 corresponding to the voltage. In the case of the correction with a linear polynomial, the compensation correcting section 23 calculates the torque compensating quantity Tcn according to a following expression (2).

$$Tc_n = Ta_n \cdot \{fa(T^{cmd}, N) \cdot V + fb(T^{cmd}, N)\} + jTb_n \cdot \{(fc(T^{cmd}, N) \cdot V + fd(T^{cmd}, N)\} \quad (2)$$

Figure 8:
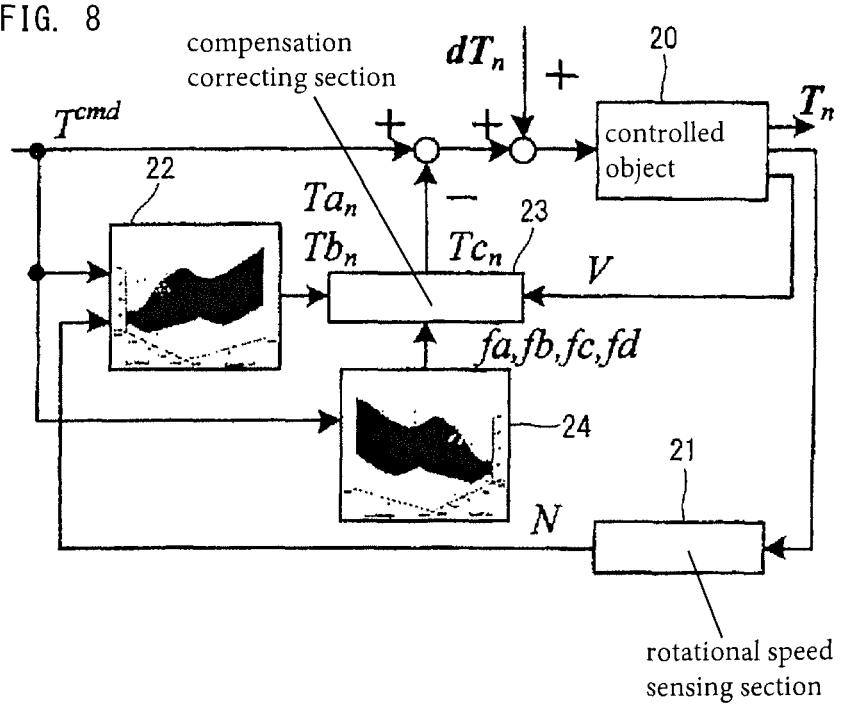
FIG. 8 is a block diagram schematically showing a main part of another periodic disturbance automatic suppressing apparatus.

FIG. 8 shows the example in which only the torque command $T^{cmd}$ is inputted to the coefficient correcting table 24. In this case, the compensation correcting section 23 calculates the torque compensating quantity Tcn with a linear polynomial according to an expression (3).

$$Tc_n = Ta_n \cdot \{fa(T^{cmd}) \cdot V + fb(T^{cmd})\} + jTb_n \cdot \{(fc(T^{cmd}) \cdot V + fd(T^{cmd})\} \quad (3)$$

Figure 9:
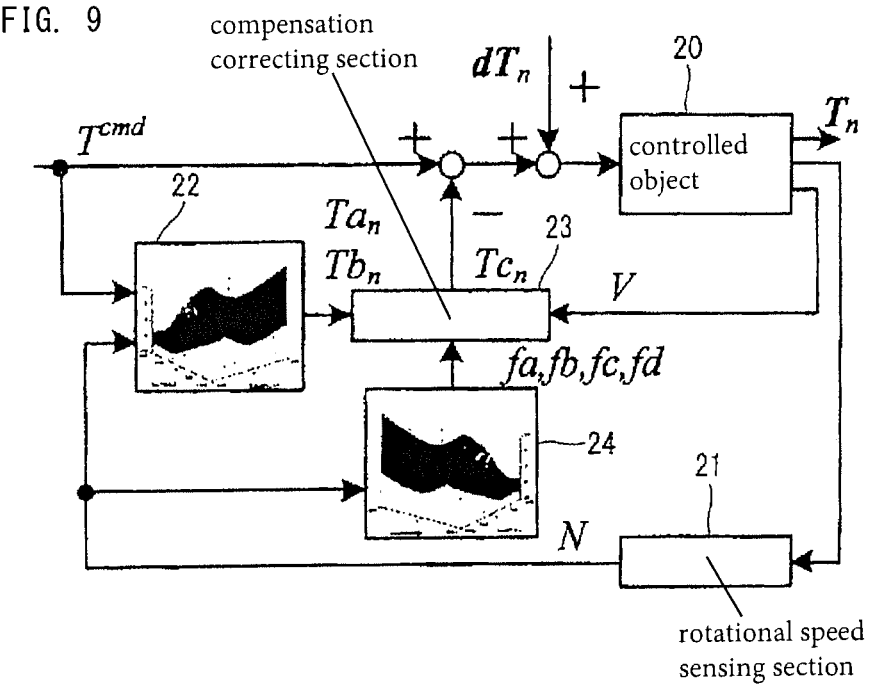
FIG. 9 is a block diagram schematically showing a main part of another periodic disturbance automatic suppressing apparatus.

FIG. 9 shows the example in which only the sensed rotational speed N is inputted to the coefficient correcting table 24. In this case, the compensation correcting section 23 calculates the torque compensating quantity Tcn with a linear polynomial according to an expression (4).

$$Tc_n = Ta_n \cdot \{(fa(N) \cdot V + fb(N)\} + jTb_n \cdot \{fc(N) \cdot V + fd(N)\} \quad (4)$$

Thus, according to the third embodiment, the system corrects the compensating quantity of the compensating table with the nth degree polynomial, and thereby the system can perform the compensation for vibration suppression in a more extended manner as compared to the compensation of the second embodiment.

Figure 10:
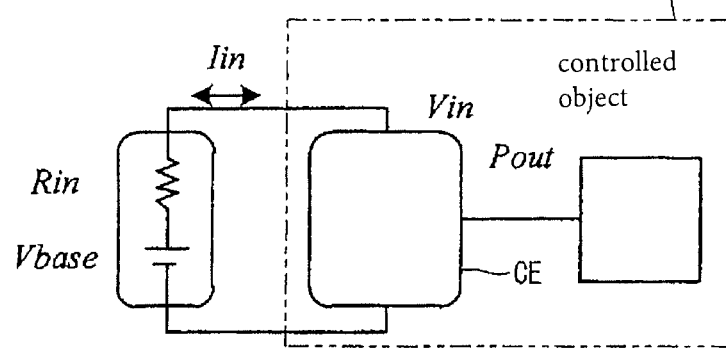
FIG. 10 is a block diagram showing control equipment in the controlled object.

In the system in which the main power source of the controlled object is a battery, it is possible to estimate the fluctuation of the main power source by estimating the decrease (or increase) quantity by the internal resistance due to the load by using the command as a reference. This embodiment is adequate to such a case. As shown in FIG. 10, the controlled object 20 includes a voltage control section or means CE capable of controlling the voltage, and controls the applied voltage Vin according to an equation (6) from the relationship of the equation (5).

$$Vin = Vbas - Iin \cdot Rin \quad (5)$$
$$Iin = Pout/Vin$$
$$Pout = \omega \cdot T^{cmd}$$

[Mathematical Expression 1]

$$Vin = \frac{Vbase \pm \sqrt{Vbase^2 - 4Rin \cdot \omega \cdot T^{cmd}}}{2} \quad (6)$$

In this equation, Rin: internal resistance of the main power source, Vbas: internal voltage of the main power source, Iin: current through the main power source, Vin: applied voltage of equipment, Pout: output voltage of the equipment, and ω: motor rotational speed.

Figure 12:
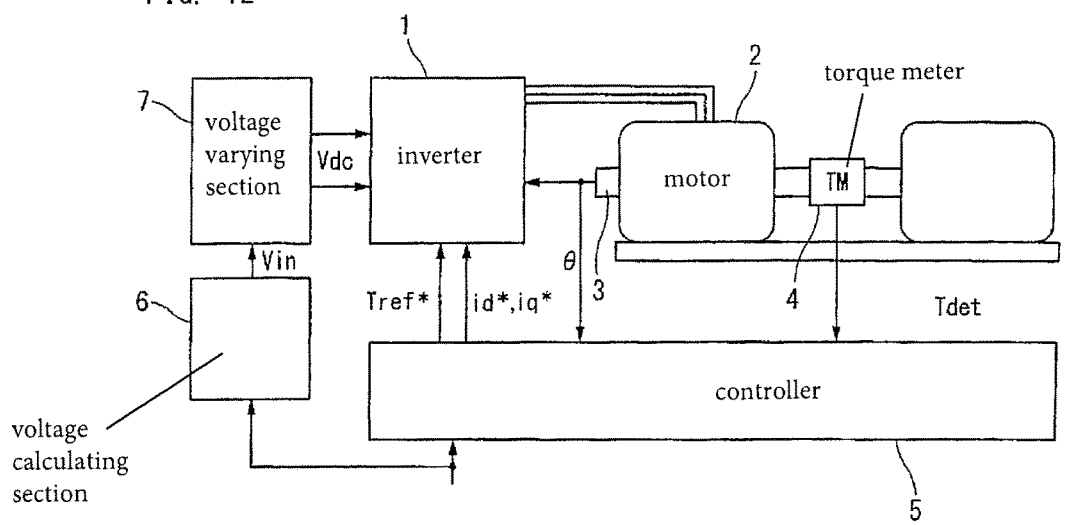
FIG. 12 is a block diagram of a learning system of a periodic disturbance automatic suppressing apparatus according to another embodiment.

Data of compensation table 22 are obtained in a following method by using the system shown in FIG. 12. The voltage Vin is calculated by inputting the torque/speed command into the voltage calculating section 6, according to the equation (6) from the relationship of equation (5), and the voltage varying section 7 controls the dc voltage Vdc of the inverter 1 in accordance with voltage Vin. In this case, the sensed rotational speed and torque are stored in the pulsation suppressing section or means of controller 5. Experimental data are obtained by performing this operation repeatedly at all the points in the assumed operating range including momentary load current fluctuation. Finally, the compensating table is produced from all the experimental data, directly or with interpolation performed partially.

Figure 11:
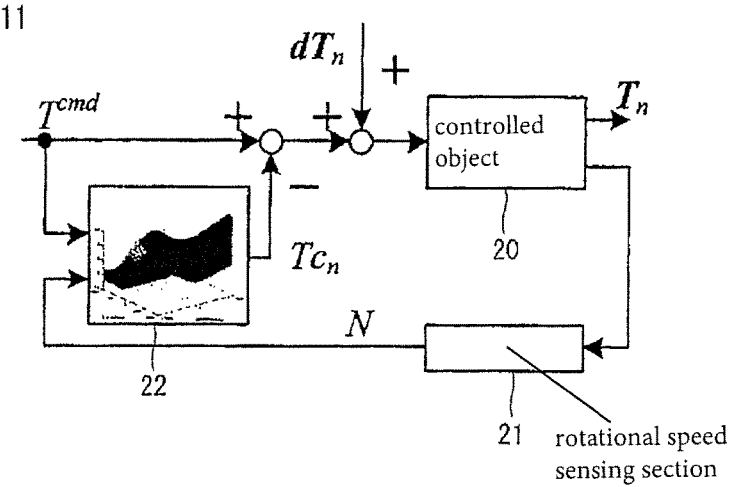
FIG. 11 is a block diagram schematically showing a main part of a periodic disturbance automatic suppressing apparatus according to another embodiment of the present invention.

As the vibration suppressing control apparatus utilizing the compensating table of this embodiment, a system of FIG. 11 is used, and the compensating table 22 is arranged so that only the torque command $T^{cmd}$ and rotational speed N are inputted to the compensating table 22. As to the generation of the nominal compensating table, the torque compensating quantity is generated with the compensating table by setting the voltage command of the voltage controlling section CE of the main power source as Vin, and by performing a voltage adjustment with the voltage controlling section CE by using the then existing torque rotational command(s) at each of the operating points. Thus, the compensating table is obtained by taking account of the voltage fluctuation in advance. With this compensating table being installed in the apparatus, the periodic disturbance automatic suppressing apparatus can achieve the vibration suppression without error as to the voltage fluctuation at the time of operation.

According to this embodiment, as compared to the first, second and third embodiments, it is possible to perform the vibration suppression accurately without varying the memory quantity of the control equipment despite the consideration of the fluctuation of the main power source voltage.

As explained above, according to the present invention, the compensating table used for the feedforward control is arranged to perform compensation even against the main power source voltage fluctuation due to load variation. Therefore, the system can perform the vibration suppressing control accurately even in the case of fluctuation in the controlled object.

The invention claimed is:

1. A periodic disturbance automatic suppressing apparatus including a compensating table of values of a torque compensating quantity for suppressing torque pulsation, prepared beforehand by extracting a torque pulsation frequency component of a controlled object, determining the torque compensating quantity by inputting a torque command and a sensed rotational speed and suppressing torque pulsation of the controlled object at each frequency component by inputting a deviation between the torque compensating quantity and the torque command into the controlled object, the compensating table being a collection of compensation tables and the apparatus being configured to sense a main power source voltage of the controlled object, to input into the compensation table corresponding to the main power source voltage and to output the torque compensating quantity related with variation of the main power source voltage.

2. A periodic disturbance automatic suppressing apparatus including a compensating table of values of a torque compensating quantity for suppressing torque pulsation, prepared beforehand by extracting a torque pulsation frequency component of a controlled object, determining the torque compensating quantity by inputting a torque command and a sensed rotational speed of the controlled object and suppressing torque pulsation of the controlled object at each frequency component by inputting a deviation between the torque compensating quantity and the torque command into the controlled object, the compensating table including a real part compensating table for correcting a real part and an imaginary part compensating table for correcting an imaginary part, and a compensation correcting section is provided to receive a sensed value of a main power source voltage V of the controlled object, and configured to correct the torque compensating quantity Tcn determined by a sum of an output Ta of the real part compensating table and a quantity jTb of the imaginary part compensating table, with a predetermined table or a proportional expression related with variation of the main power source voltage.

3. The periodic disturbance automatic suppressing apparatus as claimed in claim 2, wherein the proportional expression for correcting the torque compensating quantity Tcn is a linear polynomial expressed by;

$$Tc_n = Ta_n \cdot (a \cdot V + b) + jTb_n \cdot (c \cdot V + d)$$

where a suffix n represents an nth order component.

4. The periodic disturbance automatic suppressing apparatus as claimed in claim 2, wherein there is provided a coefficient table to receive, as inputs, the torque command and the sensed rotational speed of the controlled object, to output a coefficient of the polynomial in dependence on torque and rotational speed, and to deliver the output of the coefficient table to the compensation correcting section, and the compensation correcting section is configured to correct the torque compensating quantity Tcn with the predetermined table or the proportional expression in dependence on the torque and rotational speed.

5. The periodic disturbance automatic suppressing apparatus as claimed in claim 4, wherein the proportional expression for correcting the torque compensating quantity Tcn is a linear polynomial expressed by;

$$Tc_n = Ta_n \cdot \{fa(T^{cmd}, N) \cdot V + fb(T^{cmd}, N)\} + jTb_n \cdot \{fc(T^{cmd}, N) \cdot V + fd(T^{cmd}, N)\}$$

where fa-fd are coefficients, $T^{cmd}$ is the torque command, N is the rotational speed, V is the sensed voltage and n represents an nth order component.

6. The periodic disturbance automatic suppressing apparatus as claimed in claim 2, wherein there is provided a coefficient table to receive, as an input, the torque command, to output a coefficient of the polynomial in dependence on the torque, and to delivers the output of the coefficient table to the compensation correcting section and the compensation correcting section is configured to correct the torque compensating quantity Tcn with the predetermined table or the proportional expression in dependence on the torque.

7. The periodic disturbance automatic suppressing apparatus as claimed in claim 6, wherein the proportional expression for correcting the torque compensating quantity Tcn is a linear polynomial expressed by;

$$Tc_n = Ta_n \cdot \{fa(T^{cmd}) \cdot V + fb(T^{cmd})\} + jTb_n \cdot \{fc(T^{cmd}) \cdot V + fd(T^{cmd})\}$$

where fa~fd are coefficients, $T^{cmd}$ is the torque command, V is the sensed voltage and n represents an nth order component.

8. The periodic disturbance automatic suppressing apparatus as claimed in claim 2, wherein there is provided a coefficient table to receive, as input, the sensed rotational speed of the controlled object, to output a coefficient of the polynomial in dependence on the rotational speed, and to delivers the output of the coefficient table to the compensation correcting section and the compensation correcting section is configured to correct the torque compensating quantity Tcn with the predetermined table or the proportional expression in dependence on the rotational speed.

9. The periodic disturbance automatic suppressing apparatus as claimed in claim 8, wherein the proportional expression for correcting the torque compensating quantity Tcn is a linear polynomial expressed by;

$$Tc_n = Ta_n \cdot \{fa(N) \cdot V + fb(N)\} + jTb_n \cdot \{fc(N) \cdot V + fd(N)\}$$

where fa~fd are coefficients, N is the rotational speed, V is the sensed voltage and n represents an nth order component.

10. A periodic disturbance automatic suppressing apparatus preparing a compensating table of values of a torque compensating quantity for suppressing torque pulsation by extracting a torque pulsation frequency component of a controlled object, determining the torque compensating quantity by inputting a torque command and a sensed rotational speed of the controlled object and suppressing torque pulsation of the controlled object at each frequency component by inputting a deviation between the torque compensating quantity and the torque command into the controlled object, the controlled object employing a battery as a main power source, and including a voltage control section to control a voltage, and the compensating table being a table generated with compensating values by an applied voltage adjusted at each of operating points by the voltage controlling section.

* * * * *